(12) United States Patent
Nagara et al.

(10) Patent No.: US 8,973,078 B2
(45) Date of Patent: Mar. 3, 2015

(54) INFORMATION PROCESSING APPARATUS, INFORMATION PROCESSING METHOD, AND INFORMATION PROCESSING PROGRAM

(75) Inventors: Toru Nagara, Tokyo (JP); Kanahiro Shirota, Kanagawa (JP)

(73) Assignee: Sony Corporation (JP)

( * ) Notice: Subject to any disclaimer, the term of this patent is extended or adjusted under 35 U.S.C. 154(b) by 337 days.

(21) Appl. No.: 13/110,254

(22) Filed: May 18, 2011

(65) Prior Publication Data

US 2011/0292300 A1 Dec. 1, 2011

(30) Foreign Application Priority Data

May 25, 2010 (JP) ................. P2010-119024

(51) Int. Cl.
| | |
|---|---|
| H04N 7/16 | (2011.01) |
| H04W 12/08 | (2009.01) |
| H04N 5/445 | (2011.01) |
| H04N 21/41 | (2011.01) |
| H04N 21/4363 | (2011.01) |
| H04W 84/12 | (2009.01) |

(52) U.S. Cl.
CPC ........... *H04W 12/08* (2013.01); *H04N 5/44513* (2013.01); *H04N 21/4126* (2013.01); *H04N 21/43637* (2013.01); *H04N 2005/44521* (2013.01); *H04W 84/12* (2013.01)
USPC ........................................... 725/131; 725/141

(58) Field of Classification Search
None
See application file for complete search history.

(56) References Cited

U.S. PATENT DOCUMENTS

| | | | |
|---|---|---|---|
| 6,407,779 B1 * | 6/2002 | Herz | 348/734 |
| 2003/0147013 A1 * | 8/2003 | Martin | 348/706 |
| 2006/0041923 A1 * | 2/2006 | McQuaide, Jr. | 725/131 |
| 2007/0290876 A1 * | 12/2007 | Sato et al. | 340/825.22 |

* cited by examiner

*Primary Examiner* — Cai Chen
(74) *Attorney, Agent, or Firm* — Lerner, David, Littenberg, Krumholz & Mentlik, LLP

(57) ABSTRACT

A system and method for establishing communication between an information processing apparatus and a communication device which are capable of communicating with each other in a plurality of communication modes. The method includes receiving at least one request from the communication device at the information processing apparatus, and transmitting at least one response to the at least one request, the at least one response being transmitted from the information processing apparatus to the communication device when the information processing apparatus is in a first communication mode, and not transmitting at least one response when the information processing apparatus is in a second communication mode.

16 Claims, 16 Drawing Sheets

INFORMATION PROCESSING APPARATUS, INFORMATION PROCESSING METHOD, AND INFORMATION PROCESSING PROGRAM

CROSS-REFERENCE TO RELATED APPLICATION

The present application claims priority from Japanese Patent Application No. JP 2010-119024 filed in the Japanese Patent Office on May 25, 2010, the entire content of which is incorporated herein by reference.

BACKGROUND

1. Technical Field

The present disclosure relate to an information processing apparatus, an information processing method, and an information processing program that are capable of transmitting/receiving data wirelessly.

2. Description of the Related Art

In recent years, wireless Local Area Network (LAN) systems, that utilize a wireless LAN method according to Wi-Fi standards and can connect Personal Computer (PC) to peripheral devices such as printers by wireless communication, are known. Such a wireless LAN system produces problems such as improper connection to another wireless LAN systems and unauthorized accesses to the wireless LAN system by third parties.

For example, in a wireless LAN system described in Japanese Patent Application Laid-Open No. 2005-192202 (hereinafter, referred to as Patent Document 1), when a peripheral device is additionally connected in a wireless LAN environment, information based on a serial number of the peripheral device is used as provisional information for connection. When information specific to a peripheral device is used as information for connection to a wireless LAN system in such a manner, the improper connection to another wireless LAN system and the unauthorized accesses by third parties are prevented (see paragraphs [0041] and [0042], and FIGS. 1 and 2 in Patent Document 1).

SUMMARY

Wireless LAN systems adopting new Wi-Fi standards that enable connection between devices without an access point are being developed. In such wireless LAN systems, a connectable device is searched and information necessary for authorization and encoding is exchanged with the searched device. As a result, a wireless LAN system can be easily structured with respect to another device.

On the other hand, as described above, the improper connection to another wireless LAN system and the unauthorized accesses to the wireless LAN system by third parties might become a big problem, and it is feared that convenience and safety for users who use the wireless LAN system are deteriorated.

In view of such a circumstance, it is desirable to provide an information processing apparatus, an information processing method, and an information processing program for realizing a wireless communication system with high convenience and safety.

According to the present system and method, wireless communication that is convenient and safe can be realized.

In an illustrative embodiment, a method is provided for establishing communication between an information processing apparatus and a communication device which are capable of communicating with each other in a plurality of communication modes. The method includes receiving at least one request from the communication device at the information processing apparatus, and transmitting at least one response to the at least one request, the at least one response being transmitted from the information processing apparatus to the communication device when the information processing apparatus is in a first communication mode, and not transmitting at least one response when the information processing apparatus is in a second communication mode.

The objects, features and advantages of the present embodiments will become more apparent in light of the following detailed description and accompanying drawings.

DETAILED DESCRIPTION

Hereinafter, embodiments will be described with reference to the drawings.

<First Embodiment>

Figure 1:
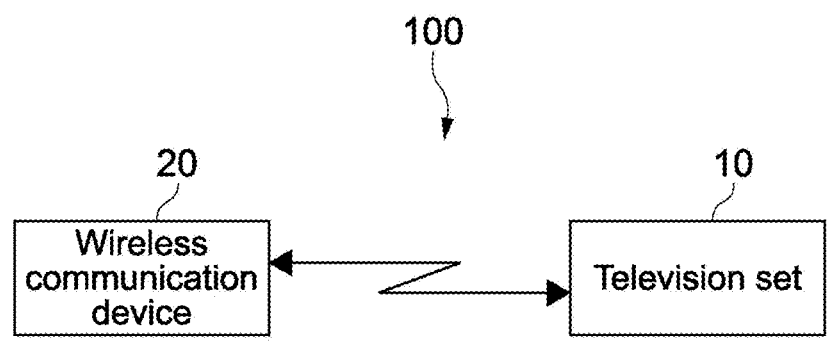
FIG. 1 is a block diagram showing a configuration example of a wireless LAN system including an information processing apparatus according to a first embodiment.

FIG. 1 is a block diagram showing a configuration example of a wireless LAN system including an information processing apparatus according to a first embodiment. A wireless LAN system 100 includes a television set 10 as the information processing apparatus according to the first embodiment, and an external wireless communication device 20 that is wirelessly connected to the television set 10.

[Configuration of Information Processing Apparatus]

Figure 2:
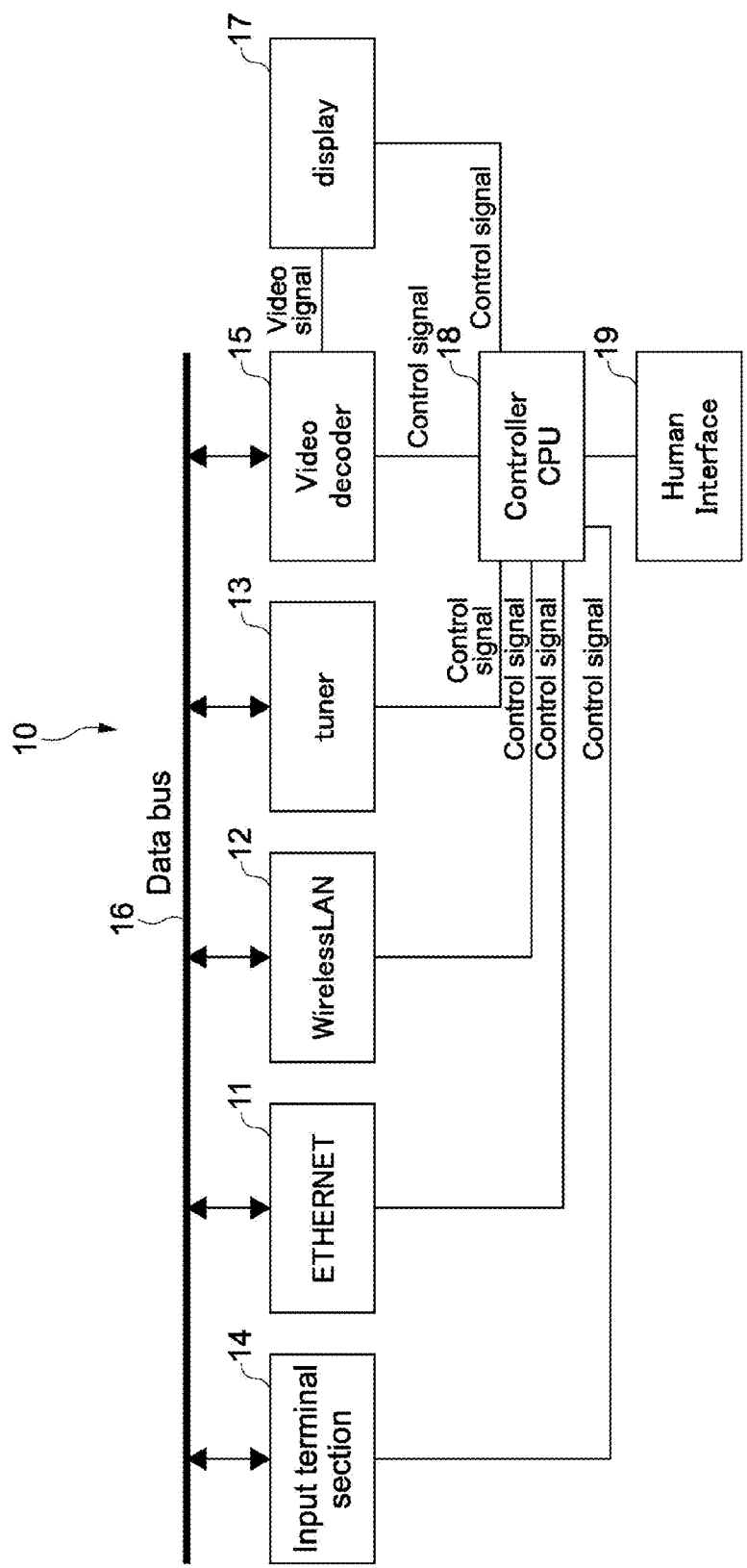
FIG. 2 is a block diagram showing a configuration example of a television set shown in FIG. 1.

FIG. 2 is a block diagram showing a configuration example of the television set 10 as the information processing apparatus according to the first embodiment. The television set 10 has an ethernet (registered trademark) section 11, a wireless LAN section 12, a tuner section 13, an input terminal section 14, a video decoder section 15, and a data bus 16 for connecting them to each other. The television set 10 further includes a display section 17, a controller Central Processing Unit (CPU) 18, and a human interface 19.

The ethernet (registered trademark) section 11 is a communication protocol processing module for communicating with another device on a network such as Local Area Network (LAN) or Wide Area Network (WAN).

The wireless LAN section 12 functions as a wireless communication section, and is a module for wirelessly communicating with another device on the network. The wireless LAN section 12 connects the television set 10 to another wireless communication device 20 so as to structure the wireless LAN system 100.

The wireless LAN section 12 according to the first embodiment structures the wireless LAN system 100 based on Wi-Fi standards. The wireless LAN section 12 structures the wireless LAN system 100 that is connected directly to the wireless communication device 20 without an access point as shown in FIG. 1.

In the first embodiment, the wireless LAN section 12 can also structure a wireless LAN system via an access point, which is not shown in the drawing. Hereinafter, a mode in which the wireless LAN section 12 provides direct connection of wireless communication to another wireless communication device 20 is referred to as a direct mode. A mode in which the wireless LAN section 12 makes connection of wireless communication via an access point is referred to as an infrastructure mode.

The tuner section 13 receives program content data of, for example, terrestrial digital television broadcasting, CS digital broadcasting, and BS digital broadcasting that are distributed from broadcasting stations, and demodulates video signals and audio signals.

The input terminal section 14 is a module for connection with an external device such as a video recording device, and includes, for example, a composite terminal, a D video terminal, and a High Definition Multimedia Interface (HDMI) terminal.

The video decoder section 15 decodes content data of broadcasting programs that are compression-coded, and outputs the decoded content data as video signals to the display section 17. The video decoder section 15 decodes image data stored in a storage area or the like of the controller CPU 18, and outputs the decoded image data as video signals to the display section 17.

The display section 17 is a display device using, liquid crystal, Electro-Luminescence (EL), Cathode Ray Tube (CRT), and the like.

The controller CPU 18 controls operations of respective blocks shown in FIG. 1. The controller CPU 18 has a storage area that is formed by Read Only Memory (ROM), Random Access Memory (RAM), and the like, which are not shown. For example, the ROM stores programs and various data such as image data to be processed and executed by the controller CPU 18. The RAM is used as a temporary work area for the controller CPU 18 and a region for temporarily saving data. The programs include various applications for processing image data or the like.

The programs and the various data may be stored in a nonvolatile storage device (not shown) such as Hard Disk Drive (HDD) installed in the television set 10. The programs and the like may be stored in a removal recording medium, such as an optical recording medium or a magnetic recording medium, and may be read by a drive section (not shown) of the television set 10.

The human interface 19 functions as an input section for inputting various operations to be performed by a user as electric signals into the controller CPU 18 (hereinafter, the human interface 19 is described as the input section 19). In the first embodiment, a remote controller is used as the input section 19, but for example, a pointing device, a keyboard, a touch panel, or another operating device may be used. When the input section 19 includes a touch panel, the touch panel can be integral with the display section 17.

Figure 3:
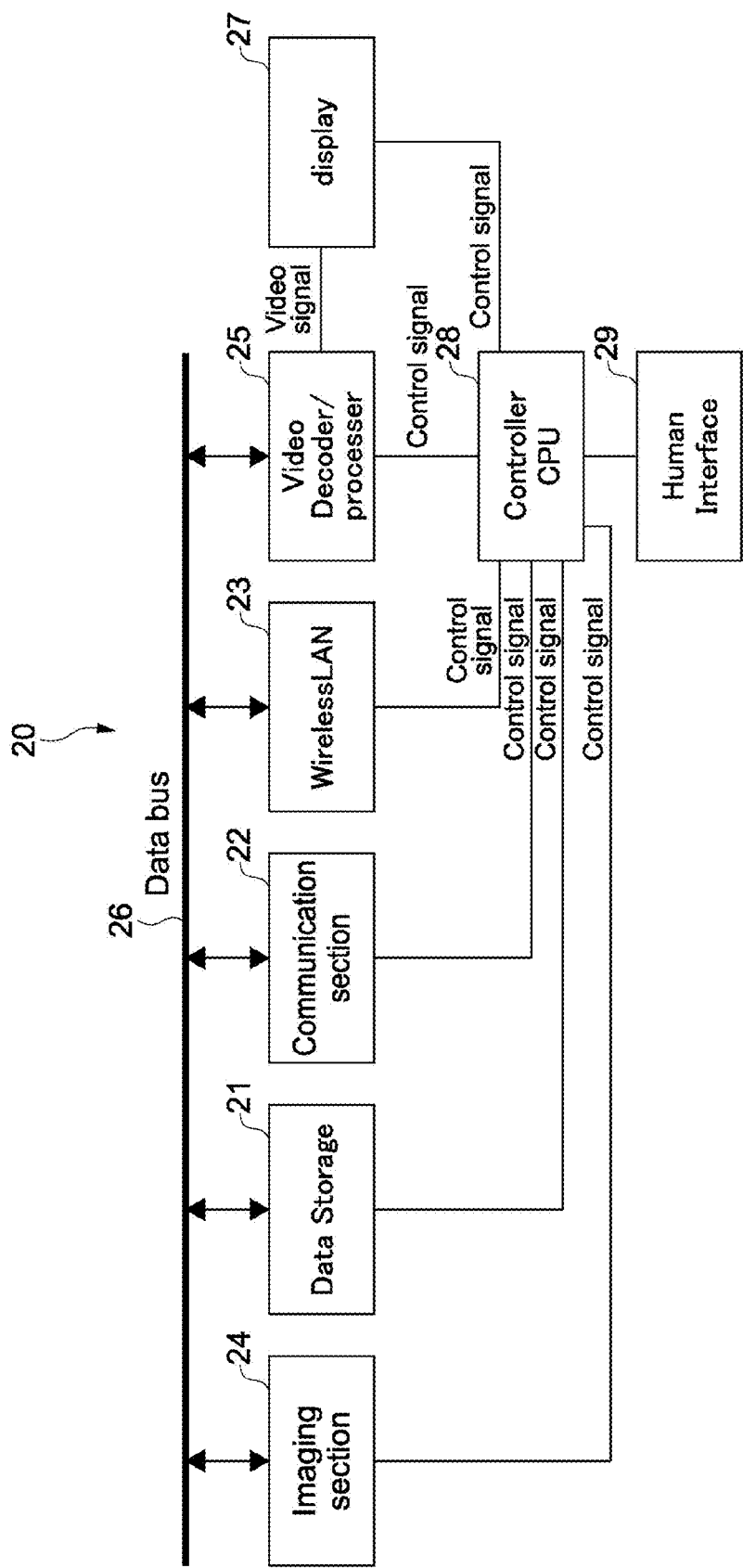
FIG. 3 is a block diagram showing a configuration example of an external wireless communication device shown in FIG. 1.

FIG. 3 is a block diagram showing a configuration example of the external wireless communication device 20 shown in FIG. 1. A mobile telephone is described as an example of the wireless communication device 20. However, the wireless communication device 20 may be any device as long as it can wirelessly communicate with the television set 10 described above in the direct mode. Hereinafter, the wireless communication device 20 is described as the mobile telephone 20.

The mobile telephone 20 has a data storage 21, a communication section 22, a wireless LAN section 23, an imaging section 24, a video decoder/processor section 25, and a data bus 26 for connecting them to each other. The mobile telephone 20 has a display section 27, a controller CPU 28, and a human interface 29.

The communication section 22 has an antenna that transmits/receives radio waves of predetermined frequencies, a frequency converting section, a modulating/demodulating section, and the like. The communication section 22 is an interface that performs data communication with a server device on the Internet according to a W-CDMA system, a CDMA 2000 system or the like, and performs voice communication with another mobile telephone.

The video decoder/processor section 25 outputs image data as a video signal to the display section 27. The video decoder/processor section 25 can execute various image processes on still images, moving images, and the like, which are generated by the imaging section 24.

The data storage 21 is a nonvolatile storage device, and is, for example, an HDD, a flash memory, or another solid-state memory. Content of moving images or the like generated by the imaging section 24, or various programs for operating the mobile telephone 20 are stored in the data storage 21.

[Operation of Information Processing Apparatus]

The operation of the television set 10 as the information processing apparatus according to the first embodiment is described. The operation of the television set at the time of transmitting various requests for the connection of the wireless communication from the mobile telephone 20 to the television set 10 shown in FIG. 1 is described. For example, when a user having the mobile telephone 20 desires to take images of people and landscape using the mobile telephone 20 and to display the images on the display section 17 of the television set 10, the following operation is performed.

Figure 4:
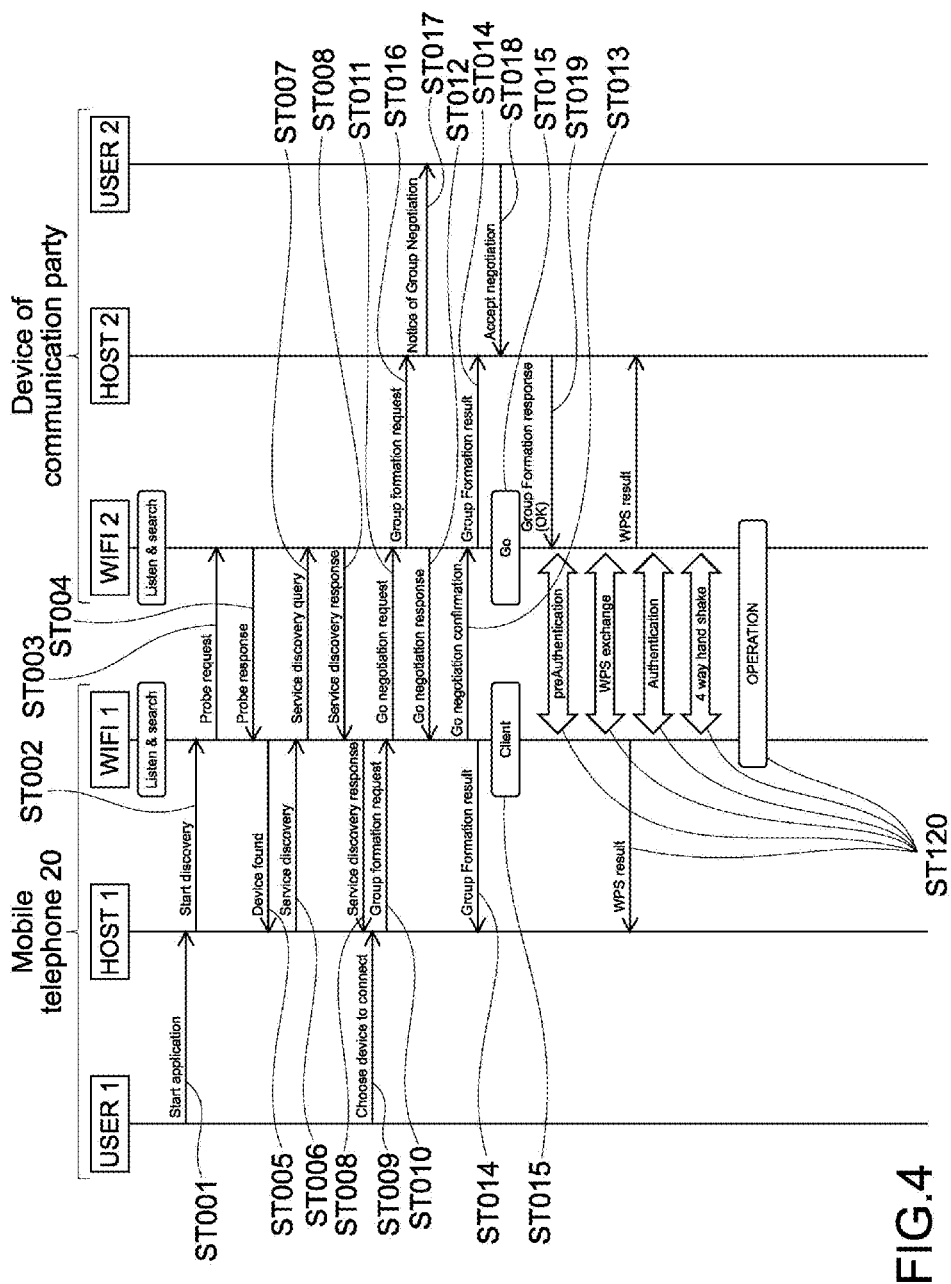
FIG. 4 is a sequence diagram showing a flow of a process up to structuring of the wireless LAN system between a mobile telephone and a device of a communication party.
Figure 5:
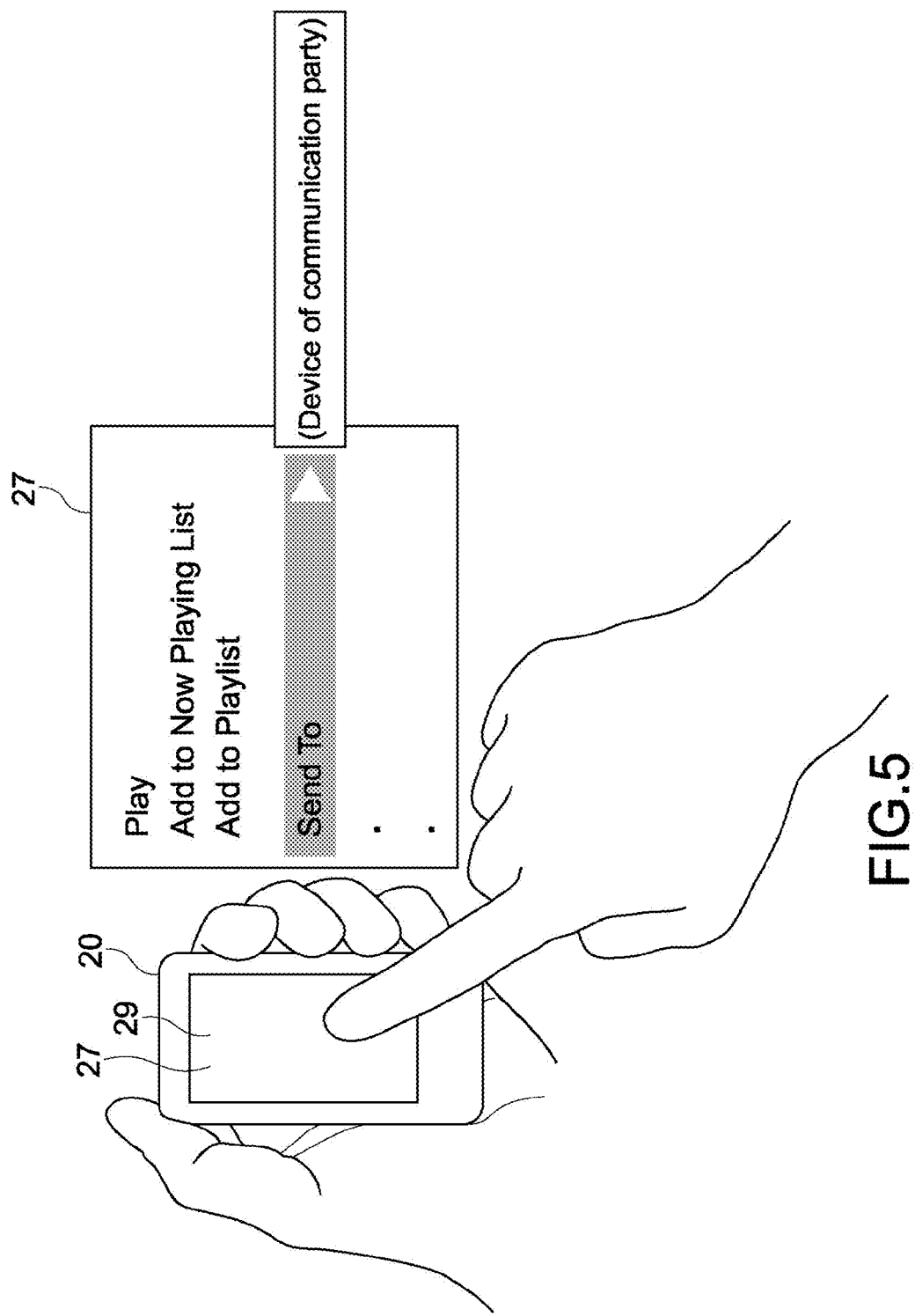
FIG. 5 is a pattern diagram showing a display section of the mobile telephone.

The operation of the mobile telephone 20 for transmitting various requests for the connection of wireless communication is described. FIG. 4 is a diagram for explaining the operation, and is a sequence diagram showing a flow of a process up to structuring the wireless LAN system between the mobile telephone 20 and a device of a communication party. FIG. 5 is a pattern diagram showing the display section 27 of the mobile telephone 20.

As shown in FIG. 4, an application for determining a device to be a wireless communication party is started by a user's operation via the touch panel 29 (see FIG. 5) as the input section of the mobile telephone 20 (Step 001). As a result, a device discovery function starts, and ProbeRequest that is a device search request for searching a device of a communication party is transmitted from the wireless LAN section 23 of the mobile telephone 20 (Steps 002 and 003). The mobile telephone 20 detects a device that has transmitted ProbeResponse as a response to the ProbeRequest to the mobile telephone 20 (Steps 004 and 005).

Next, a service discovery function of the mobile telephone 20 starts, and ServiceDiscoveryQuery as a device information request for confirming a function of the device transmitting the ProbeResponse to the mobile telephone 20 is transmitted (Steps 006 and 007). ServiceDiscoveryResponse as a response to the SeriveDiscoveryQuery is transmitted from a device as a communication party to the mobile telephone 20 (Step 008). As a result, devices suitable as parties of the wireless communication for the mobile telephone 20 are listed. As shown in FIG. 5, names of the devices are displayed on the display section 27 of the mobile telephone 20. For example, when an image in the mobile telephone 20 is desired to be displayed, a device having an image reproducing function is selected as the device of the communication party.

When the device of the communication party displayed on the display section 27 is selected by the user via the touch panel 29, a group formation function starts (Steps 009 and 010). The wireless LAN section 23 of the mobile telephone 20 transmits GoNegotiationRequest as a connection request for connecting to the device selected by the user for wireless communication (Step 011). GoNegotiationResponse as a response to the GoNegotiationRequest is transmitted to the mobile telephone 20, and degrees of desires of both sides to be GroupOwner (GO) are compared (Steps 012 to 014). A determination is made based on the comparison result whether which one of the mobile telephone 20 and the device of the communication party becomes GO or Client (Step 015).

The device of the communication party that receives the GoNegotiationRequest allows the display section of the device, for example, to display User Interface (UI) for the user to select whether to connect. As a result, the intention of a user using the device of the communication party whether to connect can be confirmed (Steps 016 and 017). Further, the user's operation on the UI for connection of the wireless communication may be a trigger of authentication by Wi-Fi Protected Setup (WPS) (Steps 018 and 019). Finally, the authentication by the WPS is conducted so that the wireless communication is enabled between the mobile telephone 20 and the device of the communication party (Step 120). Another method may be used as the method for authenticating between the mobile telephone 20 and the device of the communication party.

Figure 6:
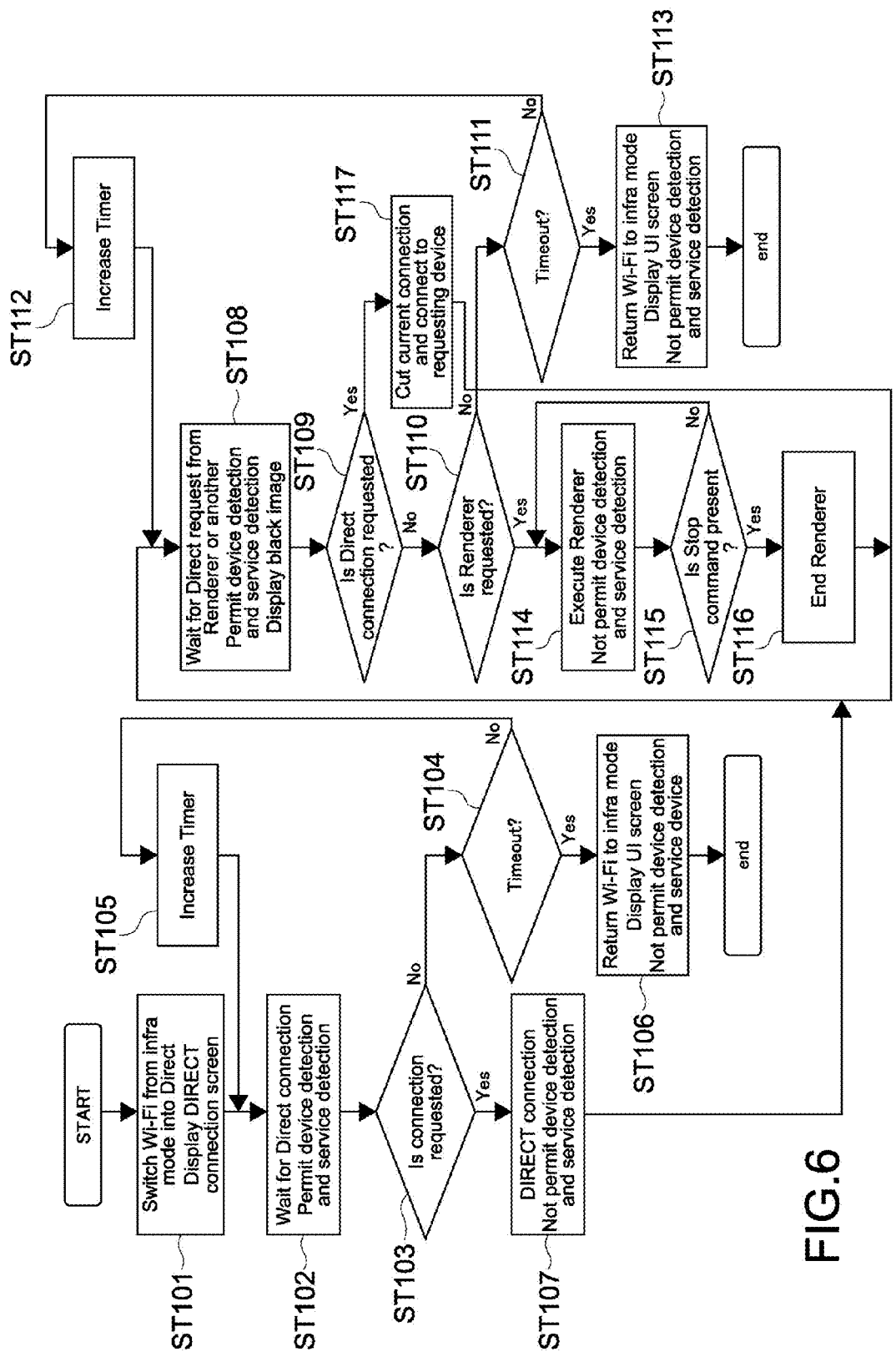
FIG. 6 is a flowchart showing an operation of the television set shown in FIG. 1.
Figure 7:
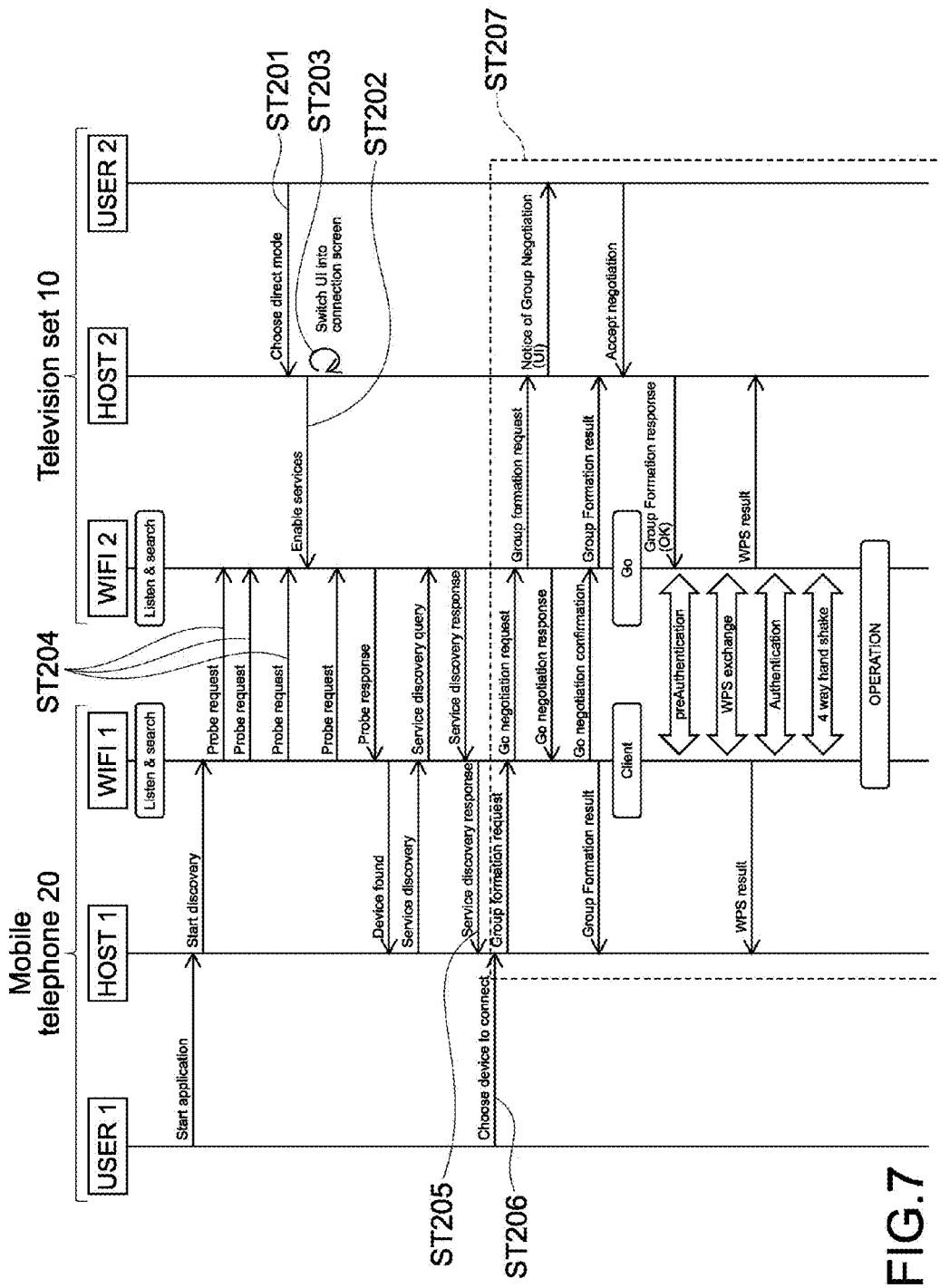
FIG. 7 is a sequence diagram showing a flow of a process up to structuring of the wireless LAN system between the television set and the mobile telephone shown in FIG. 1.

An operation of the television set 10 according to the first embodiment with respect to the mobile telephone 20 that performs the above operation is described. FIG. 6 is a flowchart showing an operation of the television set 10. FIG. 7 is a sequence diagram showing a flow of a process up to structuring of the wireless LAN system 100 shown in FIG. 1 between the television set 10 and the mobile telephone 20.

The following process of the television set 10 is realized by cooperation of software stored in the ROM and hardware resource of the television set 10. Concretely, the controller CPU 18 loads a program structuring the software stored in the ROM and the like into the RAM and executes the program, so that the following process is realized.

Figure 8:
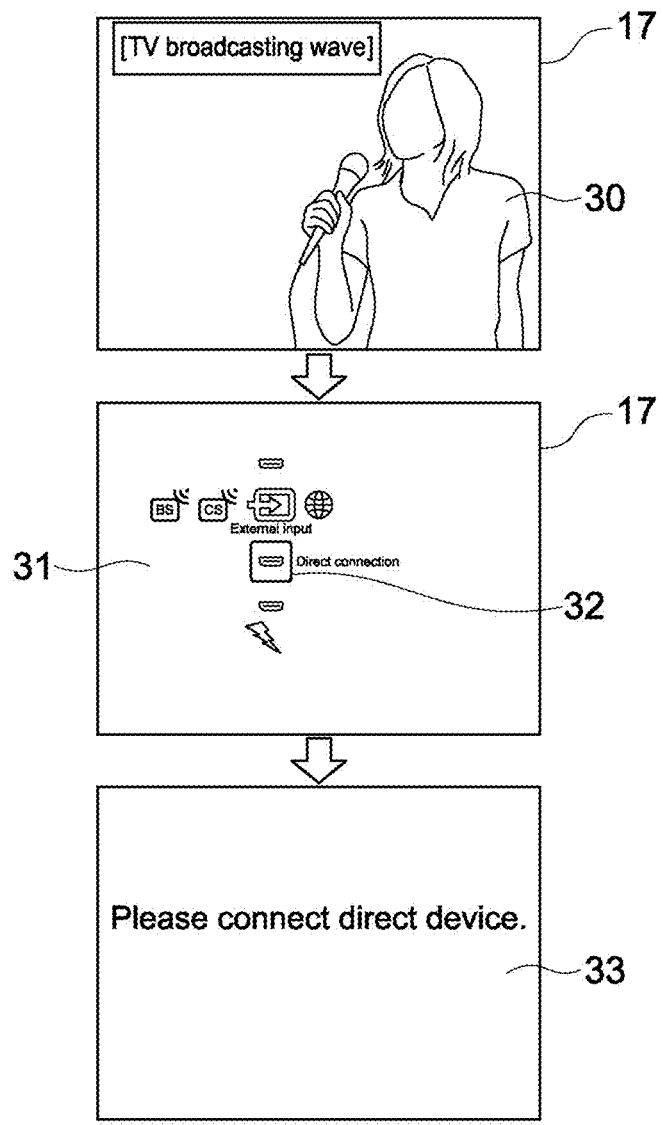
FIG. 8 is a diagram for explaining steps shown in FIG. 6.

At first, the user switches the infrastructure mode into the direct mode (Step 101). FIG. 8 is a diagram for explaining the Step 101.

As shown in FIG. 8, in a state that content 30 of television broadcasting programs, for example, are displayed on the display section 17 of the television set 10, a UI 31 for mode selection is displayed. The UI 31 for mode selection is displayed by operation of the input section 19 by the user, for example. When the input section 19 is operated based on the UI 31, selection whether to establish the connection to the mobile telephone 20 for the wireless communication is input as a selection signal into the controller CPU 18. That is to say, the direct mode is selected by a user's explicit operation.

In the first embodiment, a cross media bar configured by arranging a plurality of different thumbnail images into a cross shape is used as the UI 31 for mode selection. An icon 32 of "a virtual Wi-FiDirect terminal" as well as various input terminals is arranged on a row where an external input terminal such as the HDMI is selected. When the icon 32 of "the virtual Wi-FiDirect terminal" is expressly selected by the user, the direct mode is enabled. The icon 32 for selecting the direct mode may be arranged on a row for selecting a broadcasting type such as BS digital broadcasting or a row for selecting a broadcasting station. When the icon 32 of "the virtual Wi-FiDirect terminal" is arranged on a top level of the UI 31 for mode selection, operability and convenience are improved for the user who selects the direct mode. The UI 31 for mode selection is not limited to the cross media bar.

When the user selects the direct mode, a UI 33 as a screen for direct connection is displayed on the display section 17 of the television set 10. The television set 10 is in a state of waiting for the direct connection from the external wireless communication device 20, and device detection and service detection of the television set 10 are permitted for the external wireless communication device (Step 102).

With reference to the sequence diagram of FIG. 7, the direct mode is selected at Step 201, and the state of waiting for the direct connection is obtained after Step 202. At Step 203, the UI 33 for the direct connection is displayed on the display section 17 of the television set 10.

As shown in FIG. 7, before the direct mode is selected, the ProbeResponse to the ProbeRequest transmitted by the device discovery function of the mobile telephone 20 is not transmitted. Therefore, the ProbeRequest is transmitted from the mobile telephone 20 many times (Step 204).

After the direct mode is selected, the ProbeResponse to the ProbeRequest from the mobile telephone 20 is transmitted. ServiceDiscoveryResponse to ServiceDiscoveryQuery from the mobile telephone 20 is transmitted. As a result, a name of the television set 10 is displayed as a wireless communicable party on the display section 27 of the mobile telephone 20 (Step 205, see FIG. 5).

A determination is made whether a connection request is transmitted from the mobile telephone 20 as the external wireless communication device to the television set 10 (Step 103 in FIG. 6). When the wireless LAN section 12 of the television set 10 does not receive the connection request from the mobile telephone 20 (No in Step 103), a determination is made whether duration of the direct mode timed out (Step 104). When the determination is made that the duration of the direct mode did not time out (No in Step 104), a timer value is increased (Step 105), and the state is returned to the state of waiting for the direct connection at Step 102.

Figure 9:
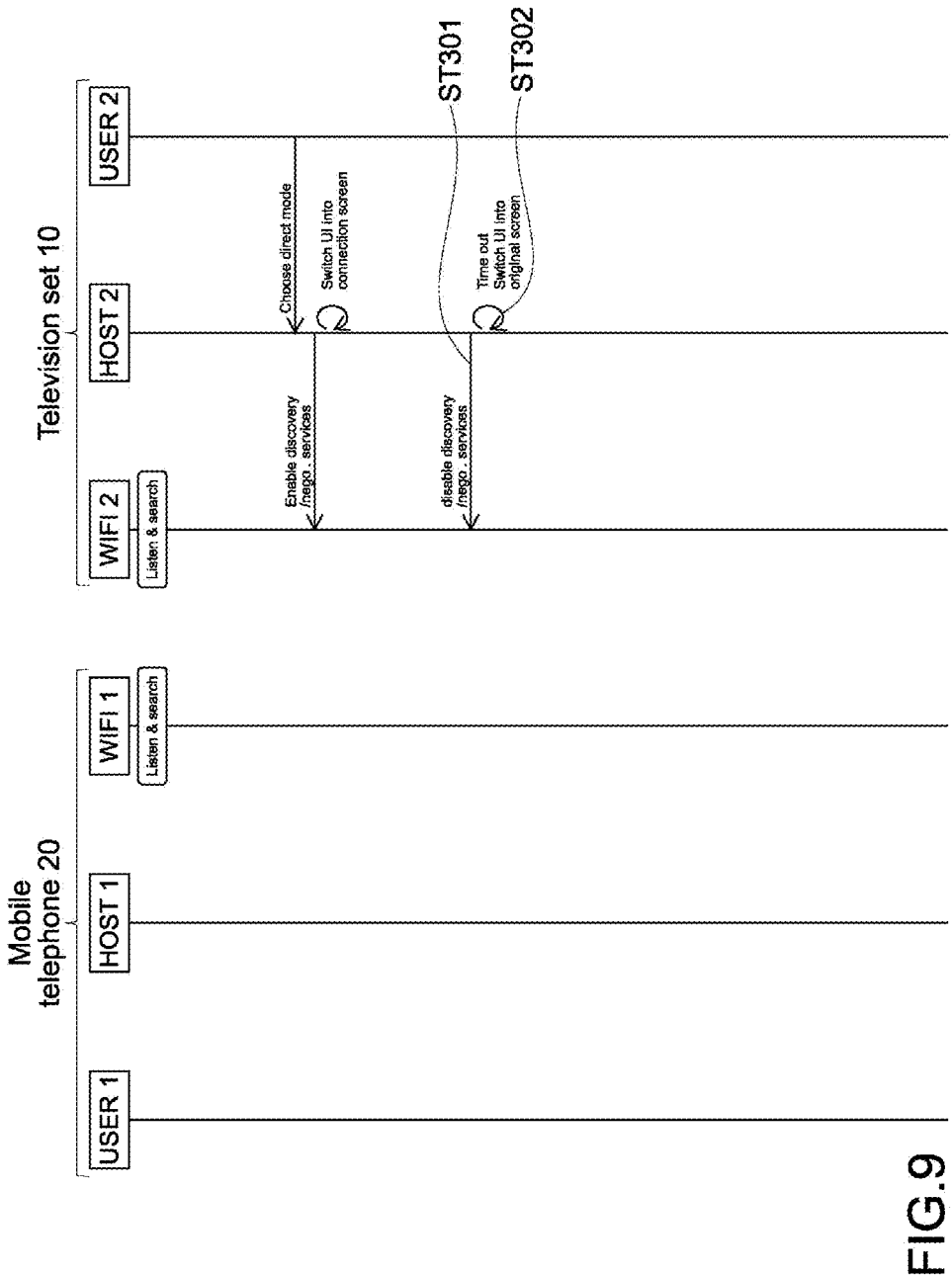
FIG. 9 is a diagram for explaining steps shown in FIG. 6.

When the determination is made that the duration of the direct mode timed out (Yes in Step 104), namely as shown in FIG. 9, when the connection request is not transmitted from the mobile telephone 20 within predetermined time, the direct mode is switched into the infra mode. UI to be displayed on the display section 17 of the television set 10 is switched into UI for the infra mode, and the device detection and the service detection are not permitted (Step 106 in FIG. 6, Steps 301 and 302 in FIG. 9). In FIG. 9, the mobile telephone 20 does not make the device detection nor service detection, but even when the device detection and the service detection are made and the connection request at Step 206 in FIG. 7 is not made within predetermined time, the duration times out similarly.

A length of the time-out is about 2 minutes, for example, but another length may be appropriately set described above. Since the time when the direct mode of the television set 10 times out is set, it is possible to prevent the connection to the external wireless communication device (mobile telephone 20) without a user's knowledge, which is caused when the transmission of the above various responses is switched into ON state and is left unattached. Any method can be adopted as a method for setting the length of the time-out and a method of measuring the time.

At Step 103 shown in FIG. 6, when the wireless LAN section 12 of the television set 10 receives the connection request from the mobile telephone 20 (Yes in Step 103), the GoNegotiationResponse to the GoNegotiationRequest from the mobile telephone 20 is transmitted. Authentication between both the devices by means of the WPS is conducted, and the wireless LAN system 100 shown in FIG. 1 is structured (Step 107, and Step 207 surrounded by a broken line in FIG. 7).

Figure 10:
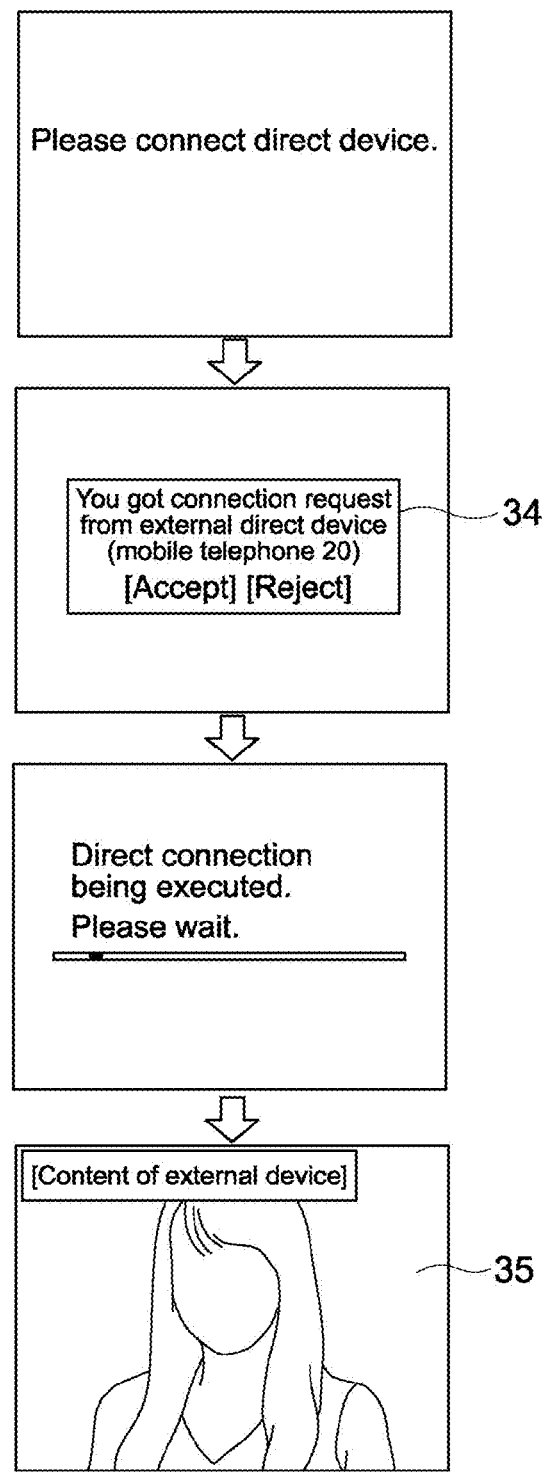
FIG. 10 is a diagram showing a display section of the television set when the television set shown in FIG. 1 receives a connection request from the mobile telephone.
Figure 11:
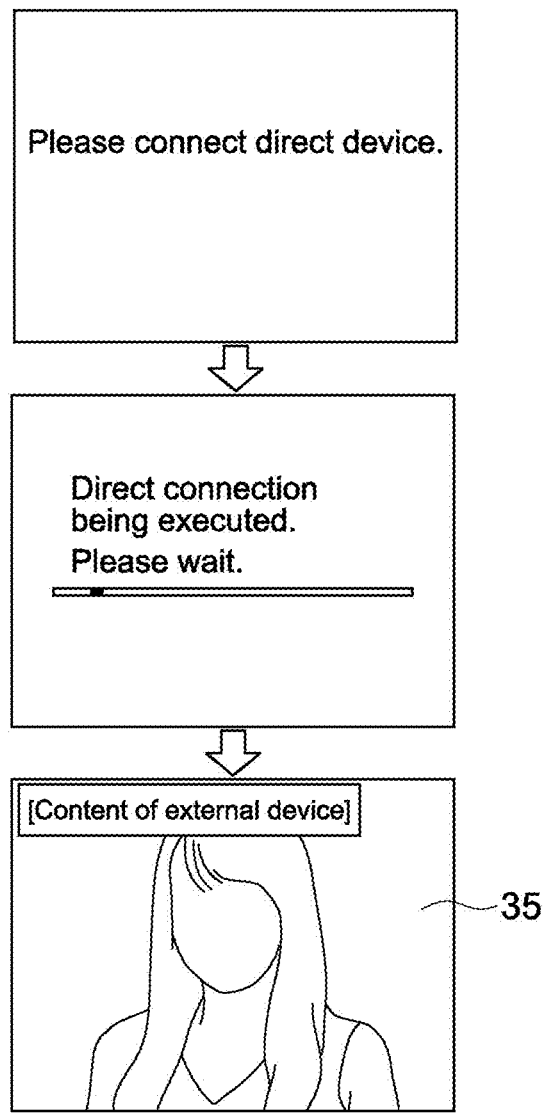
FIG. 11 is a diagram showing the display section of the television set when the television set shown in FIG. 1 receives a connection request from the mobile telephone.

As shown in FIG. 10, when the television set 10 receives the connection request from the mobile telephone 20, a UI 34 for allowing the user to determine whether to respond to the mobile telephone 20 may be displayed on the display section. On the other hand, since an intention to connect for the wireless communication is confirmed by the user's selection of the direct mode at Step 101 shown in FIG. 6, the UI 34 does not have to be displayed. In this case, as shown in FIG. 11, when the connection request from the mobile telephone 20 is received, the direct connection may be started. When the UI 34 for confirming the response to the GoNegotiationRequest is set not to be displayed, a user's work to operate the input section 19 can be omitted, thereby enhancing the operability.

The television set 10 as the information processing apparatus according to the first embodiment receives the ProbeRequest, the ServiceDiscoveryQuery, and the GoNegotiationRequest as the requests for establishing the connection for the wireless communication from the mobile telephone 20 as the external wireless communication device. The responses to these requests, the wireless LAN section 12 transmits the ProbeResponse, the ServiceDiscoveryResponse, and the GoNegotiationResponse to the mobile telephone 20. As described at Step 101 in FIG. 6, when the user selects the direct mode, the transmission of the various responses is switched into ON state. Therefore, for example, when the user desires to establish wireless communication with the external wireless communication device, the user appropriately selects the direct mode so as to be capable of appropriately setting the transmission of the various responses to be in ON state. This can suppress a possibility that the television set 10 is mistakenly connected to the wireless communication device without a user's knowledge. As a result, the wireless LAN system 100 that provides better convenience and safety to the user can be realized.

At Step 107 shown in FIG. 6, at the time when the mobile telephone 20 is connected to the television set 10, the device detection and the service detection are not permitted. That is to say, the transmission of the various responses from the television set 10 is switched into OFF state. This can prevent presence of the television set 10 from being detected by wireless communication devices other than the mobile telephone 20, thereby preventing improper connection. At Step 107, the direct mode may be ended and may be switched into the infrastructure mode. In the first embodiment, however, the transmission of the various responses is switched into OFF state, but the direct mode is not ended.

For example, there can be conceived a case where the user has a plurality of wireless communication devices and desires to connect the wireless communication devices sequentially to the television set 10, or a plurality of users each has a mobile telephone device, and desires to display images stored in the mobile telephones on the display section 17 of the television set 10. In such a case, the direct mode is not ended at Step 107 shown in FIG. 6, but the sequence goes to Step 108, and the television set 10 waits for "a renderer request" or a connection request from another wireless communication device. At this time, the transmission of various responses from the television set 10 is switched into ON state, and the device detection and the service detection are permitted. A black image is displayed on the display section of the television set 10.

"The renderer request" is a request for displaying image data transmitted from the mobile telephone 20 connected for wireless communication on the display section 17 of the television set 10. The television set 10 that have received the renderer request allows the controller CPU 18 to start an application for displaying an image.

At Step 109, when the connection request is not transmitted from a wireless communication device other than the mobile telephone 20, a determination is made whether the renderer request from the mobile telephone 20 is present (Step 110). When the renderer request from the mobile telephone 20 is not transmitted, a determination is made whether the waiting state at Step 108 timed out (Step 111). When the connection request is not received from another wireless communication device and the renderer request is not received from the mobile telephone 20 within predetermined time, the direct mode is ended so as to be switched into the infrastructure mode. At this time, the transmission of various responses from the television set 10 is switched into OFF state, so that the device detection and the service detection are not permitted (Steps 112 and 113). The length of the time-out is, for example, about 2 minutes, but may be appropriately set. The waiting time of the connection request from another wireless communication device and the waiting time of the renderer request may be set separately.

When the renderer request is transmitted from the mobile telephone 20 at Step 110, the controller CPU 18 of the television set 10 starts the application, and displays an image on the display section 17 (Step 114, see the content 35 of the external device in FIGS. 10 and 11). At this time, the transmission of various responses from the television set 10 is switched into OFF state, and the device detection and the service detection are not permitted.

A determination is made whether a stop command of the application is input from the input section 19 of the television set 10 or the mobile telephone 20 connected to the television set 10 to the television set 10 (Step 115). When the stop command of the application is not input, namely, while the execution of the application continues, the transmission of various responses from the television set 10 is maintained at OFF state. When the stop command of the application is input, the application is ended, and the sequence returns to the waiting state of Step 108 (Step 116). The transmission of various responses from the television set 10 is switched into ON state, and the device detection and the service detection are permitted.

Figure 12:
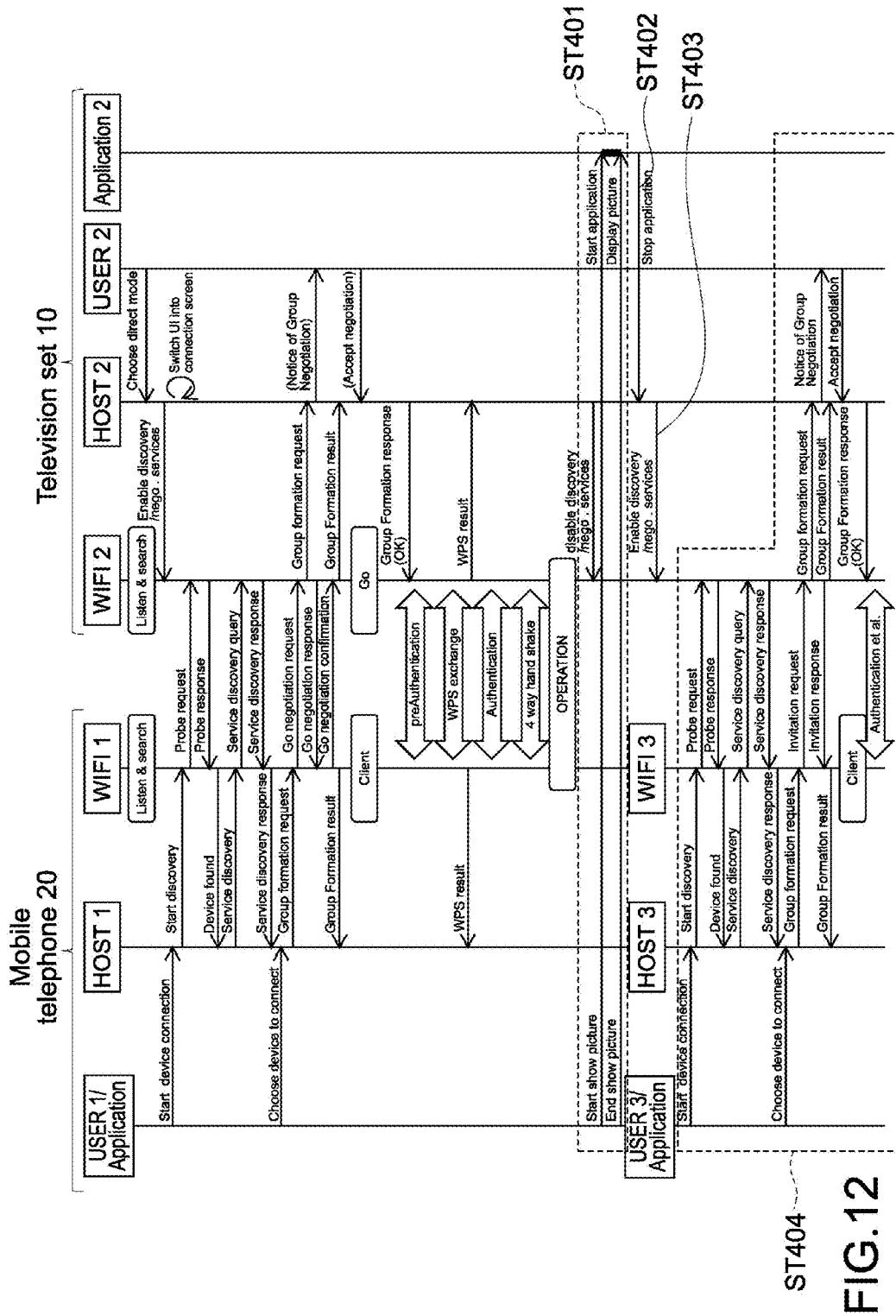
FIG. 12 is a sequence diagram for explaining a typical concrete example of the steps shown in FIG. 6.

A typical concrete example of the above described Steps 107 to 116 in FIG. 6 is described. FIG. 12 is a sequence diagram for describing the concrete example.

At Step 107 shown in FIG. 6, when the mobile telephone 20 and the television set 10 are connected to each other wirelessly, the mobile telephone 20 transmits image data to the television set 10. At the approximately same time, the renderer request is frequently transmitted from the mobile telephone 20, and an application for displaying an image starts on the television set 10. That is to say, after the wireless LAN system 100 is structured, the sequence goes to Step 114 shown in FIG. 6, and the image is displayed on the display section 17 of the television set 10 based on the renderer request from the mobile telephone 20. While the application is being executed as described above, the transmission of various responses from the television set 10 is switched into OFF state (Step 401 in FIG. 9). As a result, while the application is being executed, the presence of the television set 10 can be prevented from being detected by external wireless communication devices that are not recognized by the user, thereby preventing improper connection.

When the application is ended, the television set 10 waits for a request from another communication device at Step 108 shown in FIG. 6. A black image is displayed on the display section 17 of the television set 10, and the transmission of various responses from the television set 10 is again switched into ON state (Steps 402 and 403 in FIG. 9). As shown in the sequence diagram of FIG. 12, when a connection request is transmitted from another wireless communication device, the connection with the mobile telephone 20 is cut, and connection with the wireless communication device is carried out (Step 117 in FIG. 6, and Step 404 in FIG. 12).

For example, if the direct mode is set to be ended when the direct connection with the mobile telephone 20 is established at Step 107 in FIG. 6, the direct mode should be selected at every connection in order to sequentially connect to a plurality of wireless communication devices. However, when the waiting state at Step 108 in FIG. 6 is set, the wireless communication with a plurality of wireless communication devices can be sequentially and easily established. When the waiting state at Step 108 continues for about two minutes, a determination is made as time-out, and the direct mode is ended. Therefore, improper connection with external wireless communication devices that are not recognized by the user and unauthorized accesses can be prevented.

When the television set 10 is connected to another wireless communication device, the UI 34 for confirming the connection shown in FIG. 10 may be displayed on the display section 17 of the television set 10. As to the connection to the mobile telephone 20, a user's intention is confirmed by selecting the direct mode at Step 101 in FIG. 6. On the other hand, as to the connection to another wireless communication device, the UI 34 may be displayed in order to confirm intention of each connection. Alternatively, the following setting may be made. Specifically, time lapse after the waiting state at Step 108 is provided and before reception of a connection request from another wireless communication device is counted. If the time lapse is shorter than a predetermined time, the UI 34 is not displayed, while if the time lapse is longer than the predetermined time, the UI may be displayed. This is based on a consideration such that since any wireless communication devices recognized by the user are connected sequentially to the television set 10, the waiting time at Step 108 is short.

The application to be executed by the controller CPU 18 of the television set 10 is not limited to one based on the renderer request from the other party that makes wireless communication. Also while various applications are being executed based on user's operation signals via the input section 19, the transmission of various responses from the television set 10 is switched into OFF state. In the waiting state at Step 108, when a broadcasting program or the like is displayed on the display section 17 of the television set 10, the direct mode may be ended at that time point without waiting for time-out.

A case is considered in which improper connection is prevented only by displaying the UI 34 for confirming the connection shown in FIG. 10 in response to the connection request from the mobile telephone 20. For example, the UI 34 is displayed based on the connection request from an external wireless communication device that is not recognized by the user. At this time, the user who uses the television set 10 might mechanically perform an operation to permit connection without understanding meanings of the UI 34. As a result, the television set 10 is improperly connected to the external wireless communication device that is not recognized by the user. Further, the display of the UI 34 itself might become a problem.

Also, another case is considered in which even when the user operates the input section 19 to input a signal for non-connection, another user who uses an external wireless communication device does not recognize that the connection request is transmitted to the television set 10. As a result, the user who uses the external wireless communication device performs the operation for the connection request may times, and the UI 34 for confirming connection might be displayed on the display section 17 of the television set 10 many times. This is troublesome for the user who uses the television set 10. In the first embodiment, however, when the user desires to connect the wireless communication device (mobile telephone 20) recognized by the user to the television set 10, the user can appropriately select the direct mode. The transmission of various responses from the television set 10 can be appropriately switched between ON and OFF states. As a result, the wireless LAN system 100 that is convenient and safe for the user can be structured.

<Second Embodiment>

The television set as the information processing apparatus according to a second embodiment is described. In the following description, as to the same configurations and operations of various apparatuses as those to be used in the wireless LAN system 100 described in the first embodiment, their description is omitted or simplified.

Figure 13:
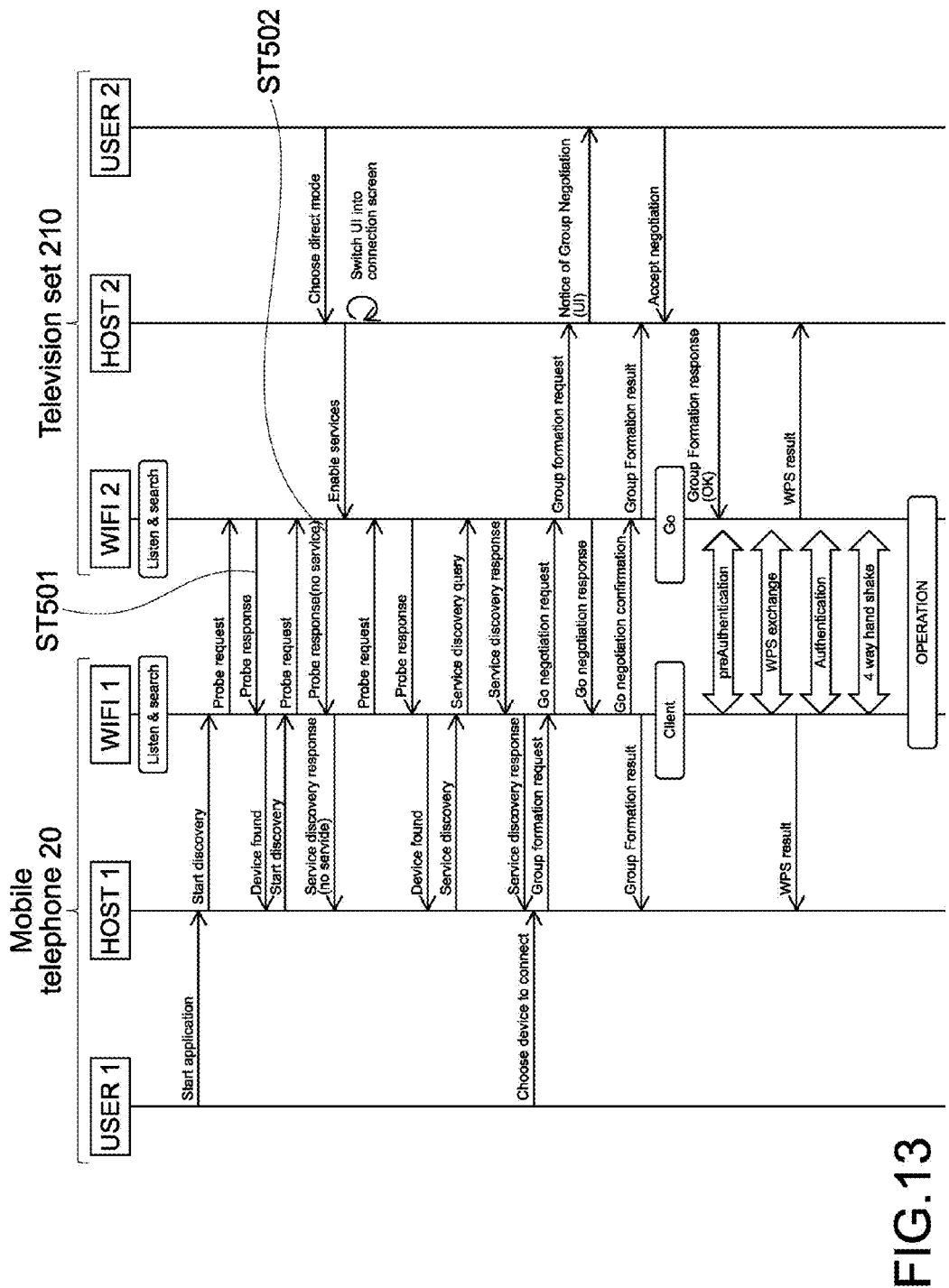
FIG. 13 is a sequence diagram showing a flow of a process up to structuring of the wireless LAN system between the television set and the mobile telephone according to a second embodiment.

FIG. 13 is a sequence diagram showing a flow of a process up to the structuring of the wireless LAN system between the television set 210 and the mobile telephone 20 according to the second embodiment.

In the first embodiment, when the direct mode is selected, the wireless LAN section 12 transmits ProbeResponse, ServiceDiscoveryResponse, and GoNegotiationResponse as responses to the various requests from the mobile telephone 20.

In the second embodiment, ProbeResponse to ProbeRequest from the mobile telephone 20 is transmitted to the mobile telephone 20 regardless of whether or not the mobile telephone 20 is in the direct mode (Step 501). The transmission of ServiceDiscoveryResponse to ServiceDiscoveryQuery from the mobile telephone 20 is appropriately switched between ON and OFF states.

As a result, when the direct mode is not selected by the user who uses the television set 210, the mobile telephone does not detect the function of the television set 210 (Step 502). Therefore, when the direct mode is not selected, the connection request from the mobile telephone 20 to the television set 10 is limited.

Figure 14:
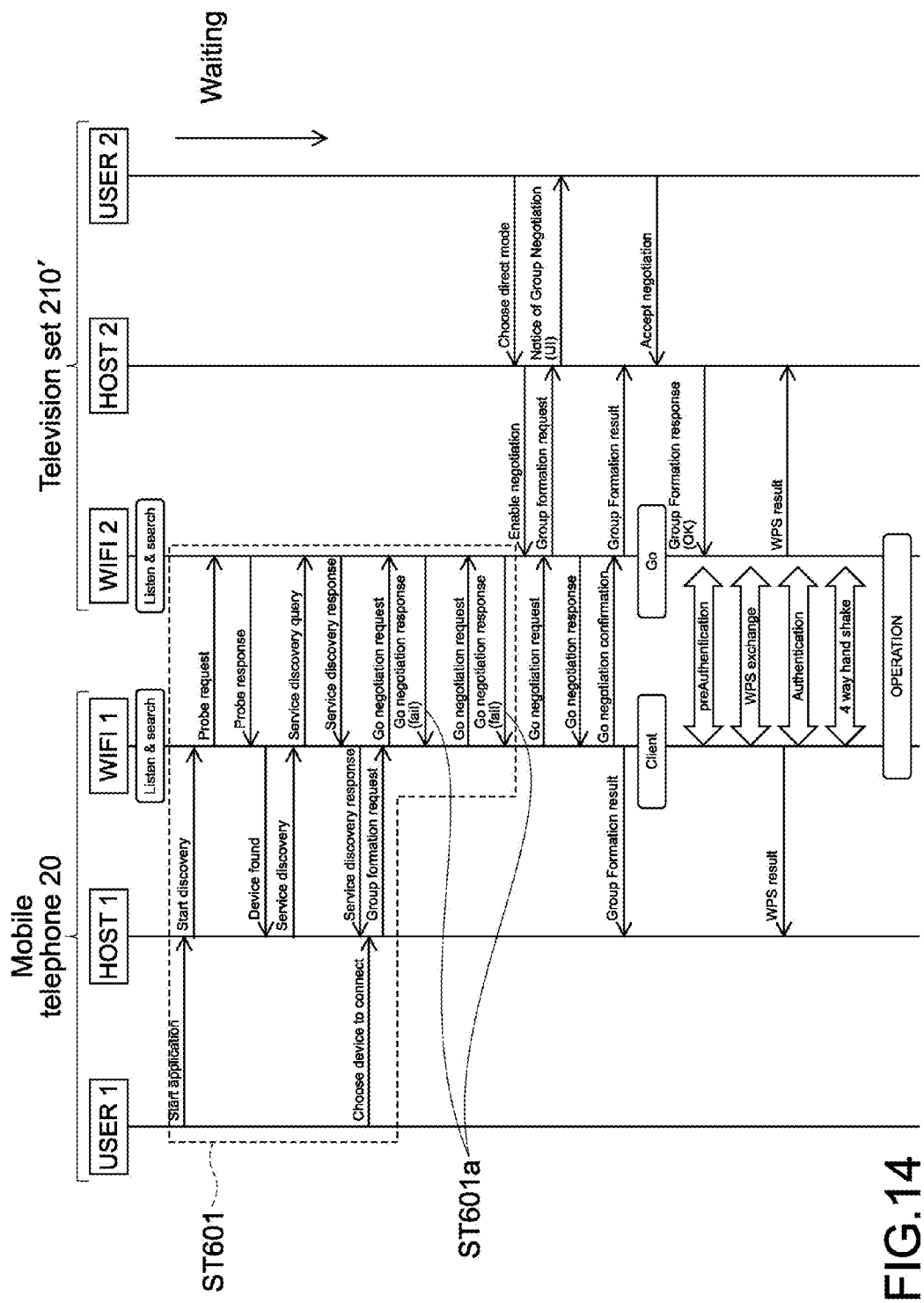
FIG. 14 is a sequence diagram for explaining a modified example of the second embodiment.

FIG. 14 is a sequence diagram for describing a modified example of the second embodiment. As shown in FIG. 14, a controller CPU of a television set 210' appropriately sets the transmission of GoNegotiationResponse to GoNegotiationRequest from the mobile telephone 20 to ON or OFF state.

As shown in FIG. 14, there can be conceived a case where before the user selects the direct mode, the mobile telephone 20 detects presence and functions of the television set 10, and transmits the connection request (Step 601). However, GoNegotiationResponse before the selection of the direct mode fails (Step 601a), and the connection between the external communication device and the television set 10 is limited.

In this example, the connection request from a wireless communication device that detected presence and functions of the television set 210' in the past and has stored them can be suitably limited, thereby preventing improper connection or unauthorized accesses.

ProbeResponse, ServiceDiscoveryResponse, and GoNegotiationResponse as the responses to the various requests from the external wireless communication device are suitably combined. Transmission of the combined response may be suitably switched between ON and OFF states.

<Third Embodiment>

Figure 15:
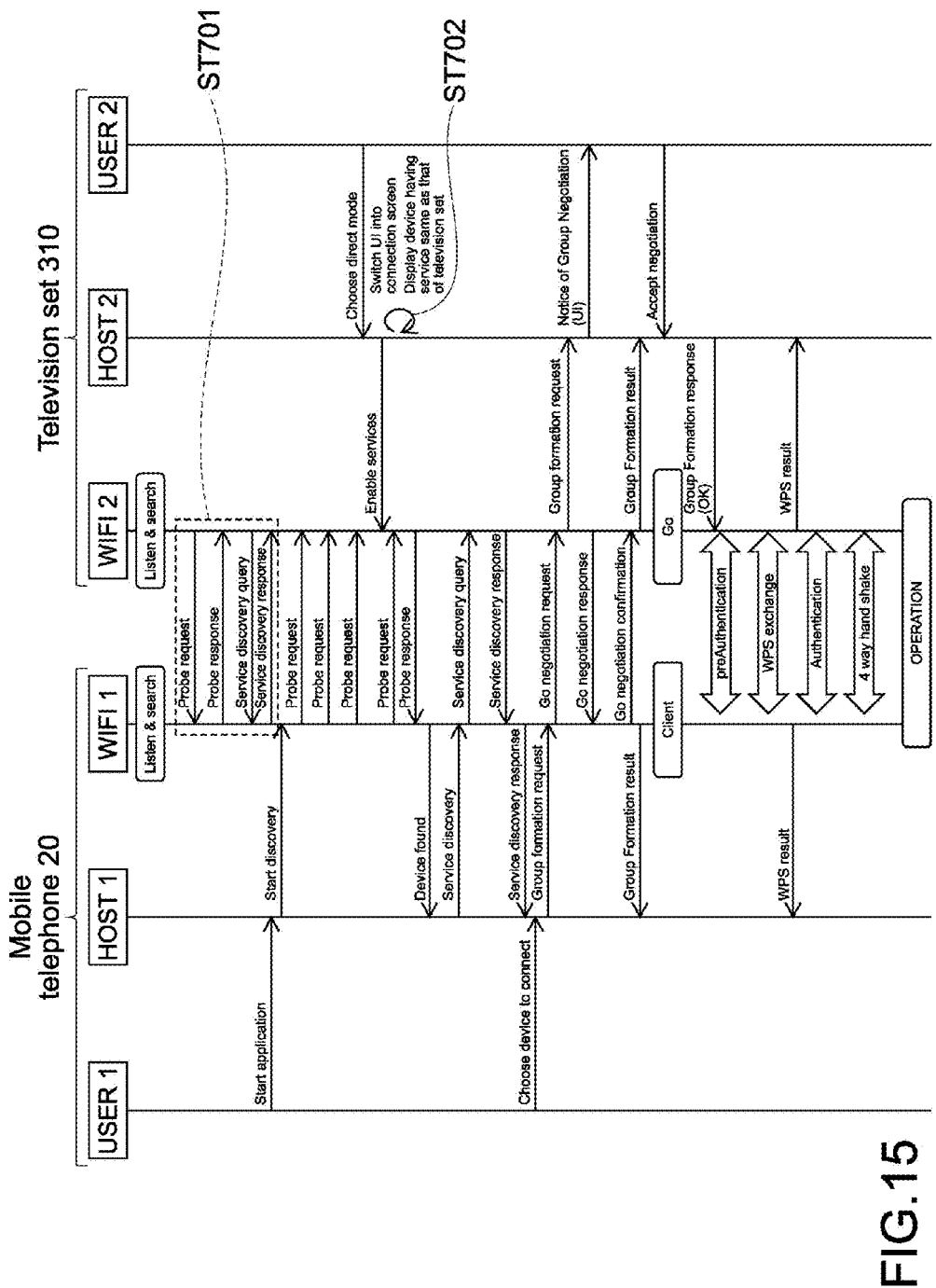
FIG. 15 is a sequence diagram showing a flow of a process up to structuring of the wireless LAN system between the television set as the information processing apparatus and the mobile telephone according to a third embodiment.
Figure 16:
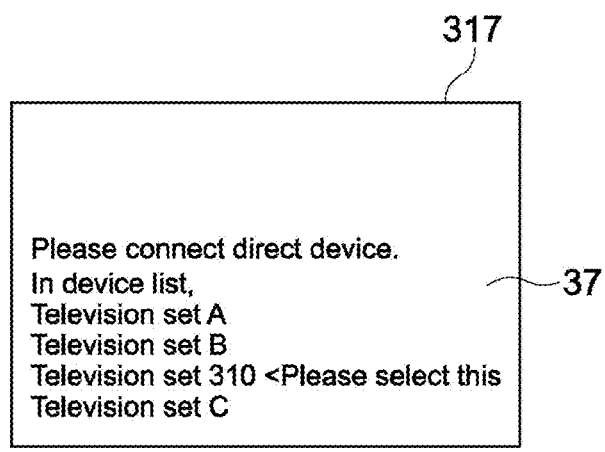
FIG. 16 is a diagram showing a display section of the television set according to the third embodiment.

FIG. 15 is a sequence diagram showing a flow of a process up to structuring of the wireless LAN system between a television set 310 as the information processing apparatus and the mobile telephone 20 according to a third embodiment. FIG. 16 is a diagram showing a display section 317 of the television set 310 according to the third embodiment.

The television set 310 according to the third embodiment has the device discovery function and the service discovery function. The use of these functions enables wireless communication devices (television sets A to C) having the same functions to those of the television set 310 to be displayed on the display section 317 (Steps 701 and 702).

As shown in FIG. 16, the searched wireless communication devices as well as the television set 310 are displayed in, for example, alphabetical order. When a user who uses the television set 310 selects the television set 310, connection with the mobile telephone 20 is clearly established, thereby preventing improper connection. In such a manner, the device search and the service search in the television set 310 allow the UI 37 shown in FIG. 16 to be displayed, and only when the user expressly operates the UI 37 to select the self device, the connection for wireless communication may be made.

<Another Embodiment>

The embodiments are not limited to the above-described embodiments, and various embodiments can be made.

In the above description, as shown in FIG. 8, the icon 32 of "virtual Wi-FiDirect terminal" is displayed on the display section 17 of the television set 10. With the icon 32, the connecting operation for wireless communication is performed based on the user's explicit intention. While the above-described connecting process for wireless communication is being executed after the icon 32 is selected, another application using Wi-Fi may be suspended. Since the user should wait for the establishment of the connection with another wireless communication device, even if another application is suspended, the user hardly has an operational uncomfortable feeling. Therefore, 100% of resources of the television set 10 for Wi-Fi direct connection can be used, and a speed of the connecting process can be increased.

Further, as described at Step 114 in FIG. 6, while the application is being executed, the transmission of various responses from the television set 10 is switched into OFF state, and the device detection and the service detection are not permitted. As a result, at the time of the Wi-Fi operation, it is not necessary to interrupt the normal communication in time division and to search for presence of another wireless communication device at each frequency channel. As a result, a load on the resources can be suppressed.

In the above embodiments, the television set is used as the information processing apparatus. However, besides the television set, Personal Computer (PC), an audio device, a projector device, a picture recorder, Personal Digital Assistant (PDA) or the like having the wireless communication function may be used. Even when such a device is used, the direct mode for connecting to an external wireless communication device is selected and the transmission of various responses to various requests transmitted from the external wireless device is appropriately switched between ON and OFF states. As a result, the same effect as that of the embodiments can be obtained.

In the respective embodiments, the wireless LAN system is structured based on the Wi-Fi standards, but any standards may be used for wireless communication.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a wireless section for establishing communication between the information processing apparatus and a communication device by receiving at least one request from the communication device, and transmitting to the communication device at least one response to the at least one request, the at least one response being transmitted from the information processing apparatus to the communication device when the information processing apparatus is in a first communication mode, and the at least one response not being transmitted from the information processing apparatus to the communication device when the information processing apparatus is in a second communication mode; and
an input section,
wherein the first communication mode enables direct communication between the information processing apparatus and the communication device without passing through an access point, and the second communication mode enables non-direct communication through the access point between the information processing device and the communication device,
wherein the input section provides a mode selector which enables a user to (i) select the first communication mode so as to set the direct communication between the information processing apparatus and the communication device without passing through the access point or (ii) not select the first communication mode so as to select the second communication mode which provides the non-direct communication through the access point between the information processing device and the communication device, in which the first communication mode can only be set by the user of the information processing apparatus through operation of the mode selector of the input section,
wherein when the user has set the information processing apparatus to the first communication mode and the at least one request is not received within a predetermined period of time following setting of the first communication mode, the information processing apparatus is automatically set to the second communication mode, and wherein when communication is established between the information processing apparatus and the communication device, the information processing apparatus does not respond to requests from other communication devices.

2. An apparatus as recited in claim 1, further comprising a video decoder for at least decoding video received from the communication device.

3. An apparatus as recited in claim 1, further comprising a display for at least displaying images received from the communication device.

4. An apparatus as recited in claim 1, wherein the at least one request is a device search request, and the at least one response is a response to the device search request.

5. An apparatus as recited in claim 1, wherein the at least one request is a device information request, and the at least one response is a response to the device information request.

6. An apparatus as recited in claim 1, wherein the at least one request is a connection request, and the at least one response is a response to the connection request.

7. An apparatus as recited in claim 6, wherein upon receiving the connection request a wireless communication authentication process is triggered for purposes of establishing communication between the information processing apparatus and the communication device.

8. An apparatus as recited in claim 6, wherein upon establishing communication the information processing apparatus switches to the second communication mode.

9. An apparatus as recited in claim 6, wherein upon receiving the connection request the user of the information processing apparatus may accept or reject the request, and the response to the connection request is sent only when the user accepts the request.

10. An apparatus as recited in claim 9, wherein when the user accepts the request the information processing apparatus is switched to the second communication mode.

11. An apparatus as recited in claim 9, wherein when the user accepts the request a wireless communication authentication process is triggered for purposes of establishing communication between the information processing apparatus and the communication device.

12. An apparatus as recited in claim 1, wherein the at least one request comprises a device search request and a device information request, the at least one response comprises a response to the device search request and a response to the device information request, and wherein if a connection request is not received within a predetermined period of time the information processing apparatus switches to the second communication mode.

13. An apparatus as recited in claim 1, wherein the at least one request comprises a device search request, a device information request and a connection request, the at least one response comprises a response to the device search request, a response to the device information request and a response to the connection request, and wherein after the information processing apparatus starts to execute an application for processing data received from the communication device via a connection established using the first communication mode the apparatus does not transmit any of the at least one response.

14. A method of establishing communication between an information processing apparatus and a communication device which are capable of communicating with each other in a plurality of communication modes, said method comprising:

receiving at least one request from the communication device at the information processing apparatus; and transmitting at least one response to the at least one request, the at least one response being transmitted from the information processing apparatus to the communication device when the information processing apparatus is in a first communication mode, and not transmitting at least one response when the information processing apparatus is in a second communication mode, wherein the first communication mode enables direct communication between the information processing apparatus and the communication device without passing through an access point, and the second communication mode enables non-direct communication through the access point between the information processing device and the communication device, and said method further comprising enabling a user by use of a mode selector to (i) select the first communication mode so as to set the direct communication between the information processing apparatus and the communication device without passing through the access point or (ii) not select the first communication mode so as to select the second communication mode which provides the non-direct communication through the access point between the information processing device and the communication device, in which the first communication mode can only be set by the user of the information processing apparatus through operation of the mode selector, wherein when the user has set the information processing apparatus to the first communication mode and the at least one request is not received within a predetermined period of time following setting of the first communication mode, the information processing apparatus is automatically set to the second communication mode, and wherein when communication is established between the information processing apparatus and the communication device, the information processing apparatus does not respond to requests from other communication devices.

15. A method as recited in claim 14, wherein the at least one request is a device search request, and the at least one response is a response to the device search request.

16. A non-transitory computer-readable medium storing a computer-readable program for implementing a method of establishing communication between an information processing apparatus and a communication device which are capable of communicating with each other in a plurality of communication modes, the method comprising:

receiving at least one request from the communication device at the information processing apparatus; and transmitting at least one response to the at least one request, the at least one response being transmitted from the information processing apparatus to the communication device when the information processing apparatus is in a first communication mode, and not transmitting at least one response when the information processing apparatus is in a second communication mode, wherein the first communication mode enables direct communication between the information processing apparatus and the communication device without passing through an access point, and the second communication mode enables non-direct communication through the access point between the information processing device and the communication device, and said method further comprising enabling a user by use of a mode selector to (i) select the first communication mode so as to set the direct communication between the information processing apparatus and the communication device without passing through the access point or (ii) not select the first communication mode so as to select the second communication mode which provides the non-direct communication through the access point between the information processing device and the communication device, in which the first communication mode can only be set by the user of the information processing apparatus through operation of the mode selector, wherein when the user has set the information processing apparatus to the first communication mode and the at least one request is not received within a predetermined period of time following setting of the first communication mode, the information processing apparatus is automatically set to the second communication mode, and wherein when communication is established between the information processing apparatus and the communication device, the information processing apparatus does not respond to requests from other communication devices.

\* \* \* \* \*